Dec. 2, 1930.  H. H. WEISS  1,783,487
MATERIAL TRANSFER APPARATUS
Filed Dec. 9, 1929   2 Sheets-Sheet 1
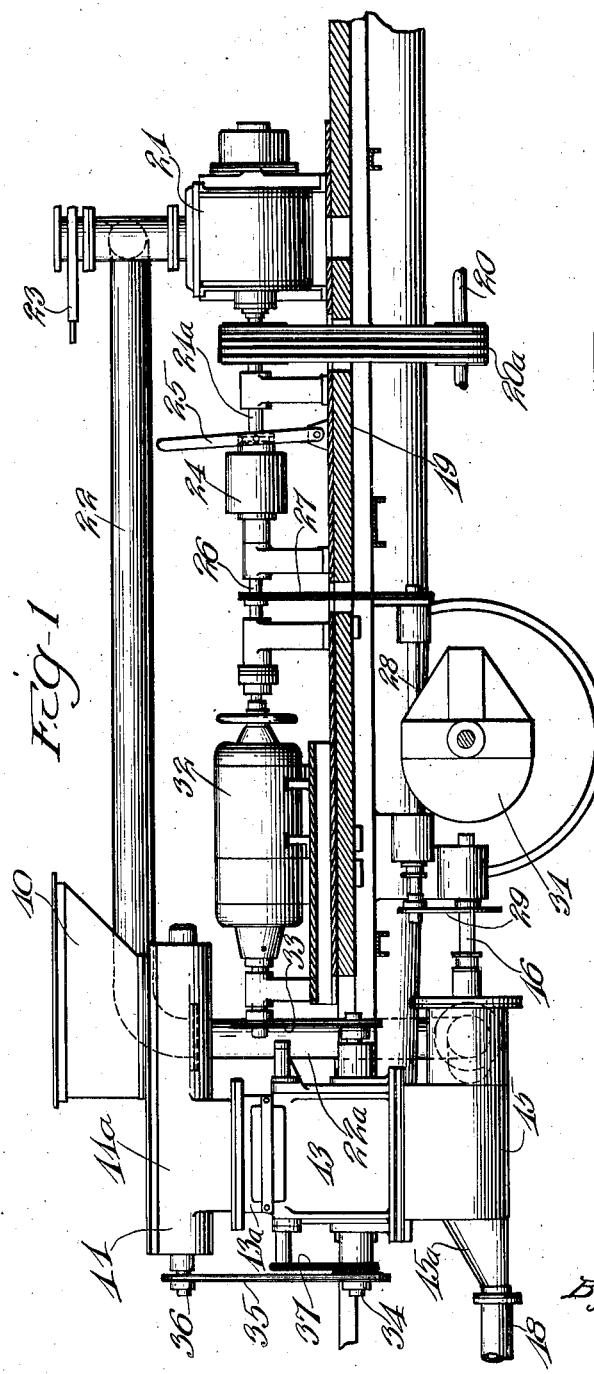
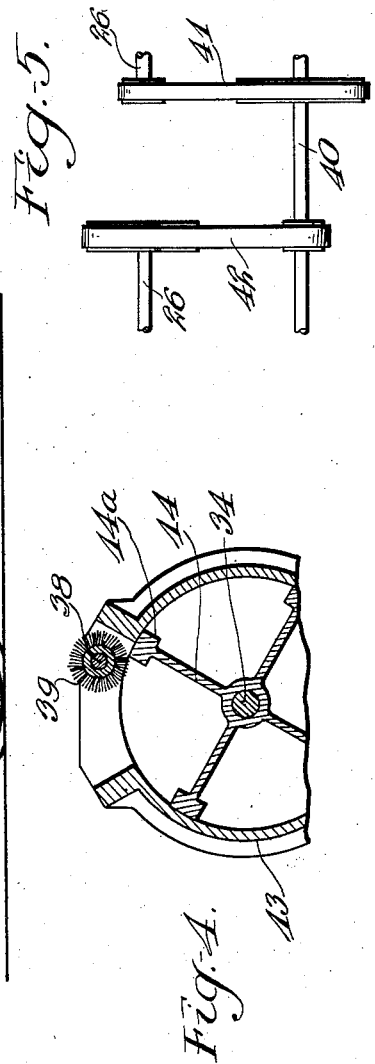
Inventor:-
Harry H. Weiss
By Stevens and Batchelor
Attys.

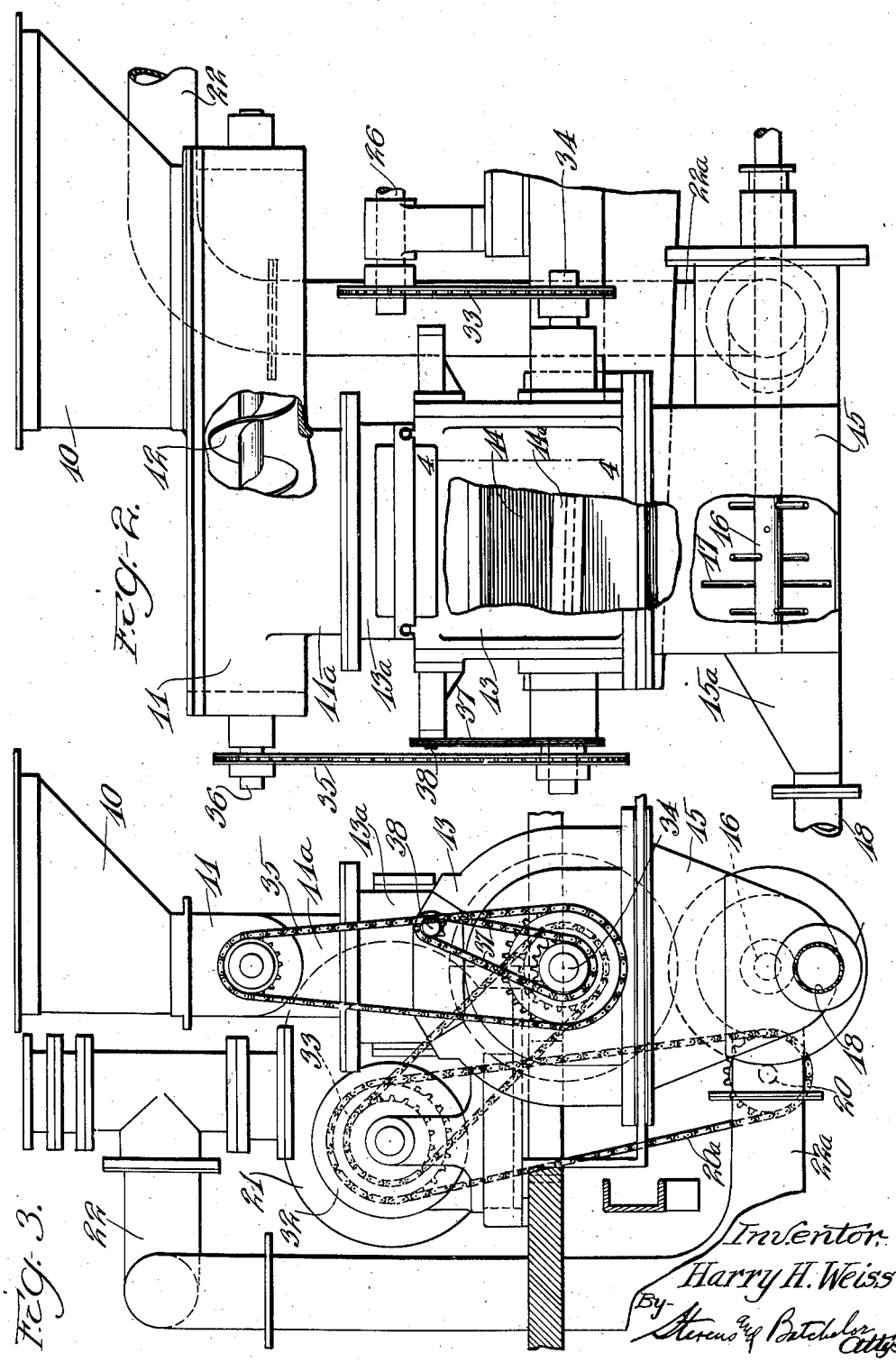

Patented Dec. 2, 1930

1,783,487

UNITED STATES PATENT OFFICE

HARRY H. WEISS, OF CHICAGO, ILLINOIS

MATERIAL-TRANSFER APPARATUS

REISSUED

Application filed December 9, 1929. Serial No. 412,823.

My invention relates to apparatus for feeding loose material to distant points, and more particularly to places to be filled by the material, and my main object is to provide an apparatus of this kind which produces a continuous feed of the material.

A further object of the invention is to provide means for feeding the material uniformly.

A still further object of the invention is to use air pressure as the propelling agent for the material.

Another object of the invention is to adapt the same for portable installation upon a truck or other vehicle which may be caused to travel to different sites at which the material is to be deposited.

An additional object of the invention is to employ in the novel apparatus a set of units which may be operated harmoniously and grouped compactly.

A final but nevertheless important object of the invention is to construct the novel apparatus along simple and sturdy lines whereby to operate efficiently for long periods and with a minimum of attention or repair.

With the above objects in view and any others that may suggest themselves from the specification and claims to follow, a better understanding of the invention may be had by reference to the accompanying drawing, in which Figure 1 is an elevation, partly in section, showing the novel apparatus;

Fig. 2 is an enlarged elevation of the left-hand portion of Figure 1, partly broken away;

Fig. 3 is a left-hand end view of the showing in Figure 2;

Fig. 4 is a detail section on the line 4—4 of Fig. 2; and

Fig. 5 is a detail of a transmission modification.

It is a familiar fact that in the filling of building walls with insulating material, the latter must be carried in containers to the upper floors and deposited between the walls. This task is a slow and expensive one and the completion of the building is materially retarded on account of it; also, in buildings already constructed, the job is considerably delayed by the seemingly primitive method of conveying the filling material. Similar conditions apply where other material of a loose character is carried to distant or elevated points for transfer into containers or storage bins, and it has been my intention to depart from the former method of conveying the material and develop an apparatus which is positive, rapid and efficient in action.

Referring specifically to the drawings, 10 denotes a hopper into which the filling material is deposited. For building insulating purposes, this material is of a light and fibrous nature, and in order that it may be put in motion, I cause the hopper 10 to lead into a horizontal duct 11, in which a spiral screw 12 operates. The screw duct 11 has an outlet 11a into the neck 13a of a rotary feeder housing 13. Figure 4 shows that this feeder is comprised of a set of radial wings 14, having sharp-edged shoes 14a, whereby to draw upon the material as it descends and cause the same to fill the spaces between the wings.

The rotary feeder 14 is operated at slower speed than the screw 12 in order that the wing filling may be of maximum capacity. However, the feeder acts as a control to assure the passage of no greater amount of material than the predetermined capacity of the feeder divisions.

The material is deposited from the feeder into a picker housing 15. Here a shaft 16 studded with a miscellany of radial rods 17 rotates. These rods act as pickers to loosen such material as descends in packed or clinging condition, the loosened material being forced out of the picker housing 15 by a forced draft of air. The housing is formed with a nozzle 15a from which a hose 18 extends to remote points of delivery. The power for the apparatus just described may be furnished by a stationary motor or one carried by the truck 19 on which the apparatus is usually mounted. Whichever power source is used it will suffice to designate 20 as the power shaft leading therefrom. From the shaft a link belt drive 20a passes to a blower 21. The latter delivers air under pressure by way of a conduit 22 which has a manually operated release valve 23 for use in case the air pressure is in excess of that required. The conduit 22 has a downward extension 22a which leads directly into the side of the picker housing 15.

The blower shaft 21a is extended beyond the drive 20a to receive a clutch 24 operated by a lever 25, the driven shaft 26 then receiving a chain drive 27 which passes to a jack-shaft 28 under the frame of the truck 19. A chain drive 29 passes from the jack-shaft 28 to the picker shaft 16. In ordinary installations, the shaft 28 could be eliminated, but in the case of a truck, a direct drive to the picker shaft would be impeded by the differential housing 31 of the truck; hence the jack-shaft 28 is provided to avoid this housing.

The driven shaft 26 receives a standard speed reducer 32 from which a chain drive 33 passes to the shaft 34 of the rotary feeder 14. A chain drive 35 rises from the shaft 34 with a multiplying ratio to the shaft 36 of the propelling screw 12. Another chain drive 37 passes from the shaft 34 to the shaft 38 of a brush 39 which cleans accumulations from the blades 14a of the rotary feeder 14, this arrangement being shown in Figure 4.

In installations where the standard speed reducer 32 of Figure 1 is unnecessary or impracticable, I use the simple belt drive reducer indicated in Figure 5. It is seen that a jack-shaft 40 is employed to receive a reduction belt drive 41 from the shaft 26 and that a further reduction belt drive 42 extends from the shaft 40 to the remote shaft section 26 from which the chain drive 33 is taken as previously explained.

It will be seen that an apparatus of a compact nature is provided by the grouping of the units as described. While a continuous draft of air under pressure is supplied, the screw 12 serves to propel the material deposited in the hopper 10 for the positive delivery thereof into the rotary feeder 14. Here the material is measured by the capacity of the wing divisions and the speed of the feeder to deliver only as much as can be handled by the picker 17. Also, the feeder has the further function of sealing the communication between the feeder and the picker whereby to prevent the backing up of the material from the force of the air draft. The latter will thus expend its entire force for the forward propulsion of the material into the transfer hose 18. This hose may be easily led to any point at which the material is to be dispensed and trained into the wall space, receptacle or bin required to be filled with the material.

It will be evident that with the use of the novel apparatus, the delivery of the material will be continuous, positive and rapid, and very little attention will be required for the control of the delivery. The harmonious assembly of the units entering into my apparatus will result in the unhindered motion of the material from the time it leaves the hopper, avoiding clogging and erratic delivery.

I claim:

1. A remote delivery apparatus for loose material, comprising a hopper, a forward screw-feed at the bottom of the hopper, a rotary-wing downward feeder leading from the screw feed, a picker agitator below the feeder, a housing for the agitator, a blower conduit leading into the housing, and a delivery conduit leading out of the same.

2. The structure of claim 1, a power drive for the screw feed and feeder, and a reduction gearing for the latter relative to the screw feed drive.

3. A remote delivery apparatus for loose material, comprising a hopper, a forward screw-feed at the bottom of the hopper, a rotary-wing downward feeder leading from the screw feed, a picker agitator below the feeder, a housing for the agitator, a blower conduit leading into the housing, and a delivery conduit leading out of the same, and a rotary brush for cleaning accumulations of material from the blades of said rotary wing.

In testimony whereof I affix my signature.

HARRY H. WEISS.